United States Patent
D'Amora

(10) Patent No.: US 7,075,530 B2
(45) Date of Patent: Jul. 11, 2006

(54) FAST LIGHTING PROCESSORS

(75) Inventor: Bruce D. D'Amora, New Milford, CT (US)

(73) Assignee: International Business Machines Corporation, Armonk, NY (US)

(*) Notice: Subject to any disclaimer, the term of this patent is extended or adjusted under 35 U.S.C. 154(b) by 429 days.

(21) Appl. No.: 10/376,092

(22) Filed: Feb. 27, 2003

(65) Prior Publication Data

US 2004/0183451 A1   Sep. 23, 2004

(51) Int. Cl.
*G06T 15/00* (2006.01)
(52) U.S. Cl. ............... 345/419; 345/426; 345/643; 345/586; 345/589; 345/660; 345/664
(58) Field of Classification Search ............... 345/426, 345/581, 586, 643, 660, 664, 418–420, 589
See application file for complete search history.

(56) References Cited

U.S. PATENT DOCUMENTS 5,850,489 A * 12/1998 Rich ..................... 382/304
5,936,629 A * 8/1999 Brown et al. ............... 345/426
5,966,672 A * 10/1999 Knupp ........................ 702/16
6,204,856 B1 * 3/2001 Wood et al. ................ 345/608
6,313,838 B1 * 11/2001 Deering ...................... 348/420

* cited by examiner

*Primary Examiner*—Haissa Philogene
(74) *Attorney, Agent, or Firm*—Louis P. Herzberg

(57) ABSTRACT

The present invention provides methods, apparatus and systems for enabling real-time lighting of 3D geometric models. While these are well-suited for all processors, these are particularly useful on low power processors typically found in PDAs, cell phones, and embedded display systems. Methods+presented utilize a preprocessing scale factor and real-time shift factor to efficiently calculate diffuse lighting intensities for the bound vertices of the geometric model. An example embodiment includes scaling first digitized data of a 3D model in a floating point datatype by a scaling factor to form scaled digitized data. The scaling factor being a proper power of two. Converting said scaled digitized data into an integer datatype forming second digitized data. Enabling a transfer of said second digitized data to a display system, and facilitating lighting and shading said second format of digitized data.

33 Claims, 11 Drawing Sheets

FAST LIGHTING PROCESSORS

FIELD OF THE INVENTION

This invention is directed to the field of lighting of 3-dimensional models on a digital display system. In particular this invention is directed to diffuse lighting of 3D geometry.

BACKGROUND OF THE INVENTION

Lighting of 3D geometry is widely used in computer-aided design. Lighting of 3D geometry includes the computation of color intensities at predetermined points on the model using a physical simulation requiring the location of a light source(s), a color of a light source(s), a location of a viewer, and a normal vector at the point on the model being lit. The normal vector in this case is defined as the vector orthogonal to a vector that lies in the plane tangent to the model being lit at that point. The computation of color intensities is dependent on calculating the amount of light that will reach the viewers eye given the preceding conditions. This amount is dependent on the contribution from ambient light in the scene in which the 3D model is viewed, diffuse light that is scattered in all directions as it strikes the models surface, and specular light that is reflected directly back to the viewers eye. Each of these aforementioned amounts can be computed by executing a separate component of a full lighting equation. The technical challenge is not how to execute the lighting equation, rather how to execute it in real-time without sacrificing quality or accuracy. Current state of the art employs specialized graphics hardware to encode and execute the full lighting equation in a real-time display system. Although this solution is appropriate for workstation and PC level systems, the form factor, heat dissipation, and power utilization make it problematic for low power devices such as cell phones and Personal Digital Assistants. Additionally, the lighting computation is traditionally executed using floating point arithmetic which is currently unavailable in low power processors. Commercial solutions such as nVidia GeForce4 TI and ATI Radeon 9500 encode the entire geometry pipeline including lighting in a graphics hardware ASIC that utilizes optimized floating point arithmetic to perform computations. This invention provides another solution that can be applied to any display system, but is particularly well suited to a new class of devices that is quickly becoming ubiquitous in today's computer system industry. These devices include cell phones, Personal Digital Systems, GPS navigation systems, and any other display system that has low power requirements and is resource constrained. This invention provides a solution to computing a lighting component in real-time using integer datatypes and power of two scaling factors during a preprocessing step. The use of integer, power of two scaling factors, and arithmetic shift instructions provides a method for computing the integer dot product of a light vector and normal to which a material property is applied using a lower number of processor cycles. This enables real-time accurate lighting without use of floating point.

SUMMARY OF THE INVENTION

This invention employs a two tier approach to provide fast lighting of 3D Geometric models. In example embodiments, first VRML (or any other scene description file format) models are used as the source data for 3D geometric models. VRML (Virtual Reality Modeling Language) has been existent for several years and although there is not a clear standard in the field of WEB graphics, VRML is an appropriate transfer format for WEB graphics. Most commercial 3D display systems would process VRML directly to light 3D geometric models, but to better solve the compute resource constraints of low power devices such as cell phones and handheld, this invention preprocesses the VRML geometric model data before it is used to display 3D lit geometric models. Preprocessing can be done off-line with a Converter application (as was done with the implementation of this invention) or alternatively and perhaps more seamlessly, can be done during synchronization or data download to the display system. This may be included in the streaming of 3D geometric data over the internet from a server to client, client to server, or peer to peer display system.

Embodiments of methods are presented which utilize a preprocessing scale factor and real-time shift factor to efficiently calculate the diffuse lighting intensities for the bound vertices of the geometric model. An example embodiment includes scaling first digitized data of a 3D model in a floating point datatype by a scaling factor to form scaled digitized data. The scaling factor being a proper power of two. Converting the scaled digitized data into an integer datatype forming second digitized data. Enabling a transfer of the second digitized data to a display system, and facilitating lighting and shading the second format of digitized data.

Embodiments of methods are presented for rendering to a device lighted triangle data of a 3D geometric model at real-time frame rates. An example method includes the steps of: scaling and compressing 3D normal data of the 3D geometric model to form scaled normal data; decompressing the scaled normal data on the device and converting the scaled normal data to fixed point representation to form decompressed data; applying diffuse lighting equation to the decompressed data to form scaled color intensities of the 3D geometric model; performing an arithmetic shift upon the scaled color intensities to remove the scaling and obtain true color intensities at each triangle vertex; and scan converting at least one triangle of the 3D geometric model.

The scope of this invention includes an API for integrating the aforementioned Converter into the synchronization or download process. While these are that is well-suited for all processors, these are particularly useful on low power processors typically found in PDAs, cell phones, and embedded display systems.

BRIEF DESCRIPTION OF DRAWINGS

These and other aspects, features, and advantages of the present invention will become apparent upon further consideration of the following detailed description of the invention when read in conjunction with the drawing figures, in which.

DESCRIPTION OF SYMBOLS

Figure 1:
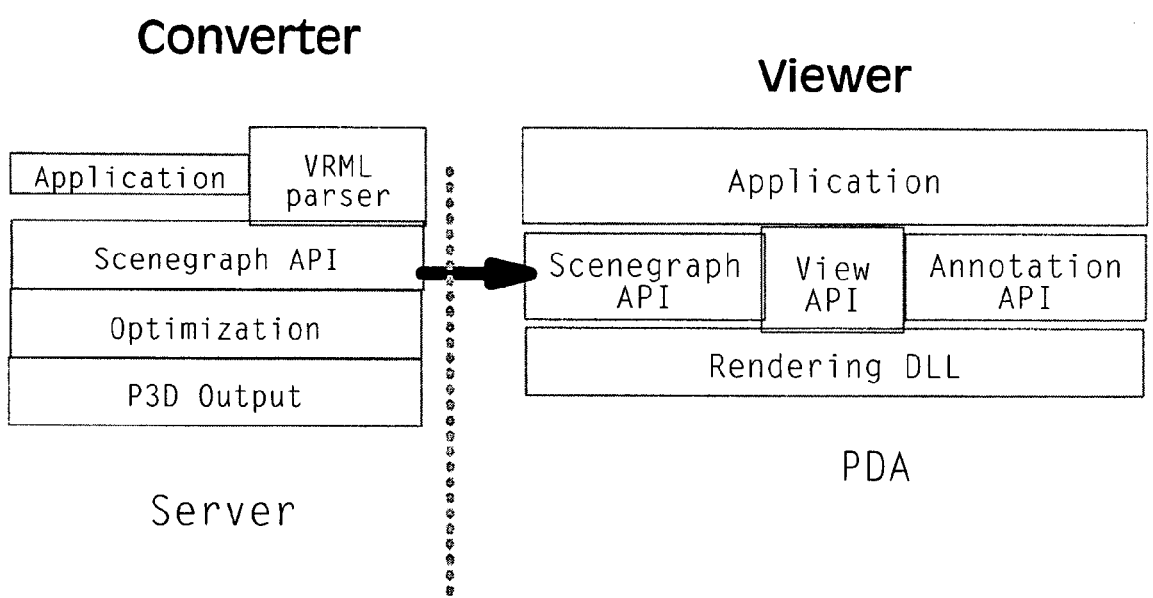
FIG. 1: Shows an example of a Converter and Viewer architecture as two separate applications running on separate devices.

300 Initiate 3D Model Conversion and download
310 Read/Parse model file
320 Check for normals
330 Read normals
340 Create normals at vertex, corner or face
350 Scale normals to fixed point integer
360 Compress normals
370 Write transcoded 3D model to file or stream
400 3D Model downloaded to PDA
410 Parse file
420 Uncompress geometric and image data
420.1 vertices, normals, texture coordinates
420.2 RGB (could be another color model) bit maps
425 Organize data into hierarchical scene graph
430 Begin rendering of scene
440 If lighting enabled process scaled fixed point normals else transform geometry
450 Only inverse transform the light vector rather than inverse transforming the normal/colors
460 Compute dot product of normal/color with light vector
470 Shift divide scale factor that was applied by Transcoder running on server
480 Clamp to RGB max/min, or to that of any other color model
490 Apply current model, viewing transforms to vertices
495 Gouraud shade, texture map, and remove hidden surfaces

DETAILED DESCRIPTION OF THE INVENTION

This invention provides methods, apparatus and systems generally employing a two tier approach to fast lighting of 3D Geometric models. In an example embodiment, first VRML (or any other scene description file format) models are used as the source data for 3D geometric models. VRML (Virtual Reality Modeling Language) has been existent for several years and although there is no clear standard in the field of WEB graphics, VRML is an appropriate transfer format for WEB graphics. Most commercial 3D display systems would process VRML directly to light 3D geometric models, but to better solve the compute resource constraints of low power devices such as cell phones and handheld, this invention preprocesses the VRML geometric model data before it is used to display 3D lit geometric models. Pre-processing can be done off-line with a Converter application (as was done with the implementation of this invention) or alternatively and perhaps more seamlessly, can be done during synchronization or data download to the display system. The invention is similarly useful to other scene description file formats. These include but are not limited to DXF, 3D Studio Max, Alias Maya, LightWave, TrueSpace, AutoCad, Shockwave3D, Web3D etc.

It is noted that the scope of this invention includes an API for integrating the aforementioned Converter into the synchronization or download process. In an example embodiment of a method implementing the present invention the following steps are performed:

1) inputting of VRML 2.0 file;
2) normalizing of floating point direction vectors;
3) scaling a floating point 3-tuple normal direction vector by an increasing scaling factor that is a power of two and does not exceed the maxium~~maximum~~ representable integer value of the target device to form an integer 3-tuple normal direction vector;
4) converting a scaled 3-tuple normal direction vector to an integer datatype
5) transferring the normal direction vector as an integer datatype to a display system
6) processing the aforementioned integer normal direction vector by forming the dot product of the vector with a light vector representing the direction of the source of the light being used to simulate a lit 3D environment in a computer display system; and
7) applying a material property for each color channngel-~~channel~~ representable in the used color model to the aforementioned dot product computed in step 6

Figure 3:
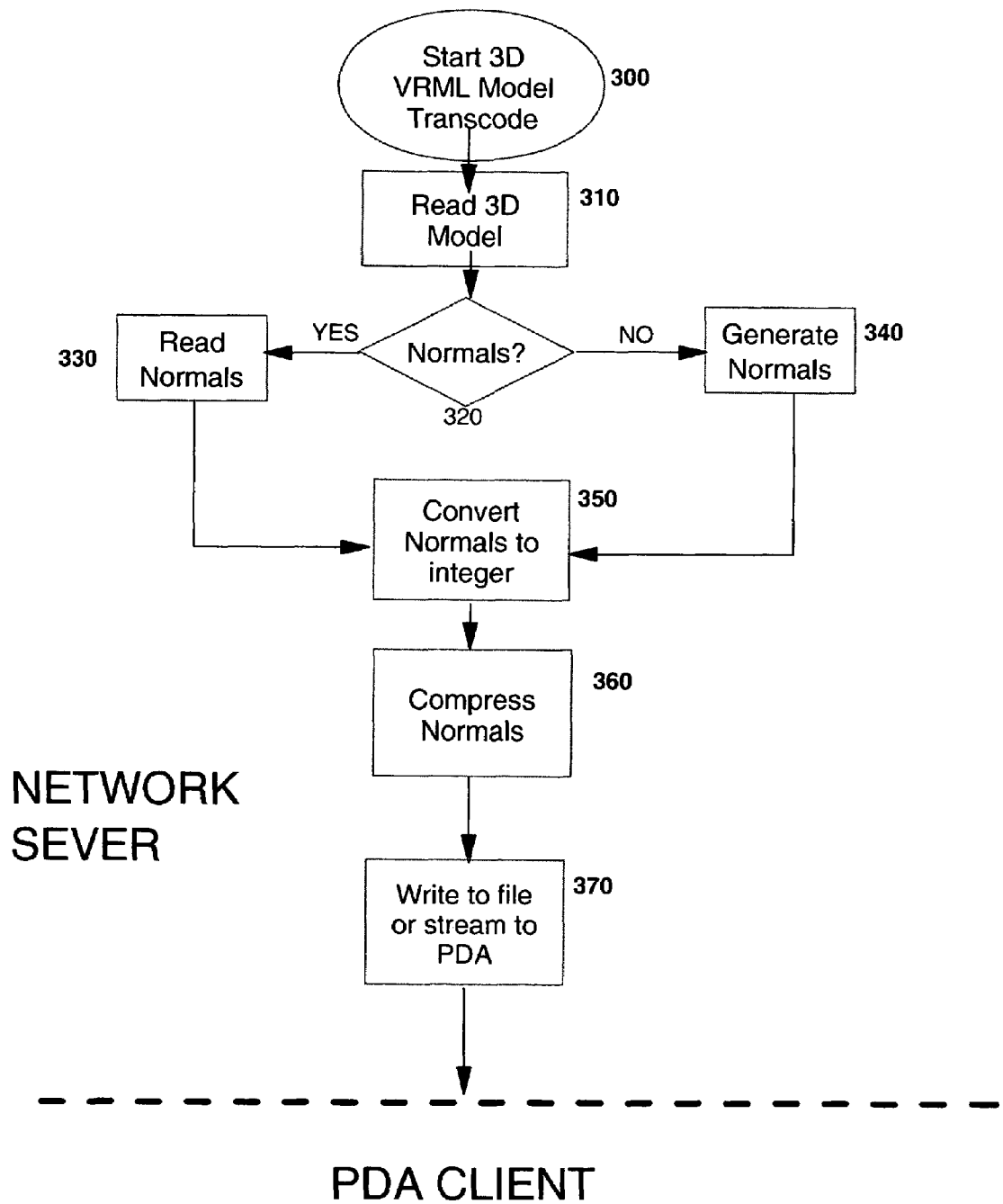
FIG. 3: Shows an example of a converter application describing a process used to encode normals in a format that is used by the viewer application.

This invention utilizes integer arithmetic, power of two scaling, and arithmetic shifts to accelerate the performance of the diffuse lighting component of the Phong lighting equation. It is important to note that this implementation uses the Phong lighting equation, but this invention can be applied to any lighting equation that requires computations based on the dot product of a normal and a light vector. This is a two phase process that involves a Converter and a Viewer application running on different devices. FIG. 1 shows the two applications and the flow of data between them. FIG. 3 describes the flow of normal and color/material data through the Converter. In order to accomplish this the geometric data which originates in VRML 2.0 file format 300 must be processed to an optimal format for the display system. VRML files are ASCII descriptions of 3D models which utilize floating point datatypes to describe the geometric data—vertices, colors, normals, texture coordinates, etc. These datatypes would consume a significant amount of memory on resource constrained devices such as cell-phones and PDAs. The Converter's purpose is to convert the floating point datatypes into datatypes that require less memory for storage and datatypes that can be operated on more efficiently by the display systems processor. The normal data required for lighting is one of the datatypes that the Converter processes. VRML model files may or may not include normal data. If the VRML model file includes normal data, the Converter ensures that this data is normalized. Normalization of a normal is defined to be a scaling of each component of the 3-tuple by the magnitude of the normal vector. It is important that the normalization occurs since the computation of light intensities will differ between normalized and non-normalized normals. This is a common problem in computer graphics 3D lighting. If model geometry does not include normal data 320, the Converter generates 340 this data at each vertex and then computes the appropriate normal based on the attribute binding mode. This normal is automatically computed in its normalized state. Attribute binding modes are commonplace in computer graphics and are defined as the granularity of one or more attributes being bound to a geometric model. These attributes can be, but are not exclusive to one of texture, normal, fog, edge, or material property. The common granularities of these bindings are defined as one attribute per triangle, or one attribute per corner of a triangle, or one attribute per vertex of a model, or one attribute per model. This step takes place in a Converter module (FIG. 3). The Converter must scale floating point normals each of which is represented as a 3-tuple, using only power of two scale factors 350. The scaling is a floating point operation since conversion to integer prior to scaling may (and often will) result in loss of data due to float to integer rounding or truncation errors. The power of two scale factor is particularly important since its use at this stage allows the display system's viewer code to employ shift instructions to remove the scale factors during the real-time lighting calculations. Shift instructions on all modern processors—but most significant to this invention—low-end processors, are usually 1 cycle instructions as opposed to integer or floating point operations which are usually emulated and typically exceed 15 cycles. The scaled floating point normals are converted to integer datatypes. Once normals are scaled and converted to integer datatypes, each 3-tuple is compressed 360 into a single 16-bit quantity. Normals are then transferred to the display systems memory or written 370 into a proprietary file format which is optimal for the display system being utilized. It is important to note that in this implementation the proprietary format is a binary one whereas the original VRML file format was ASCII. This fact alone implies a compression of data storage.

Figure 2:
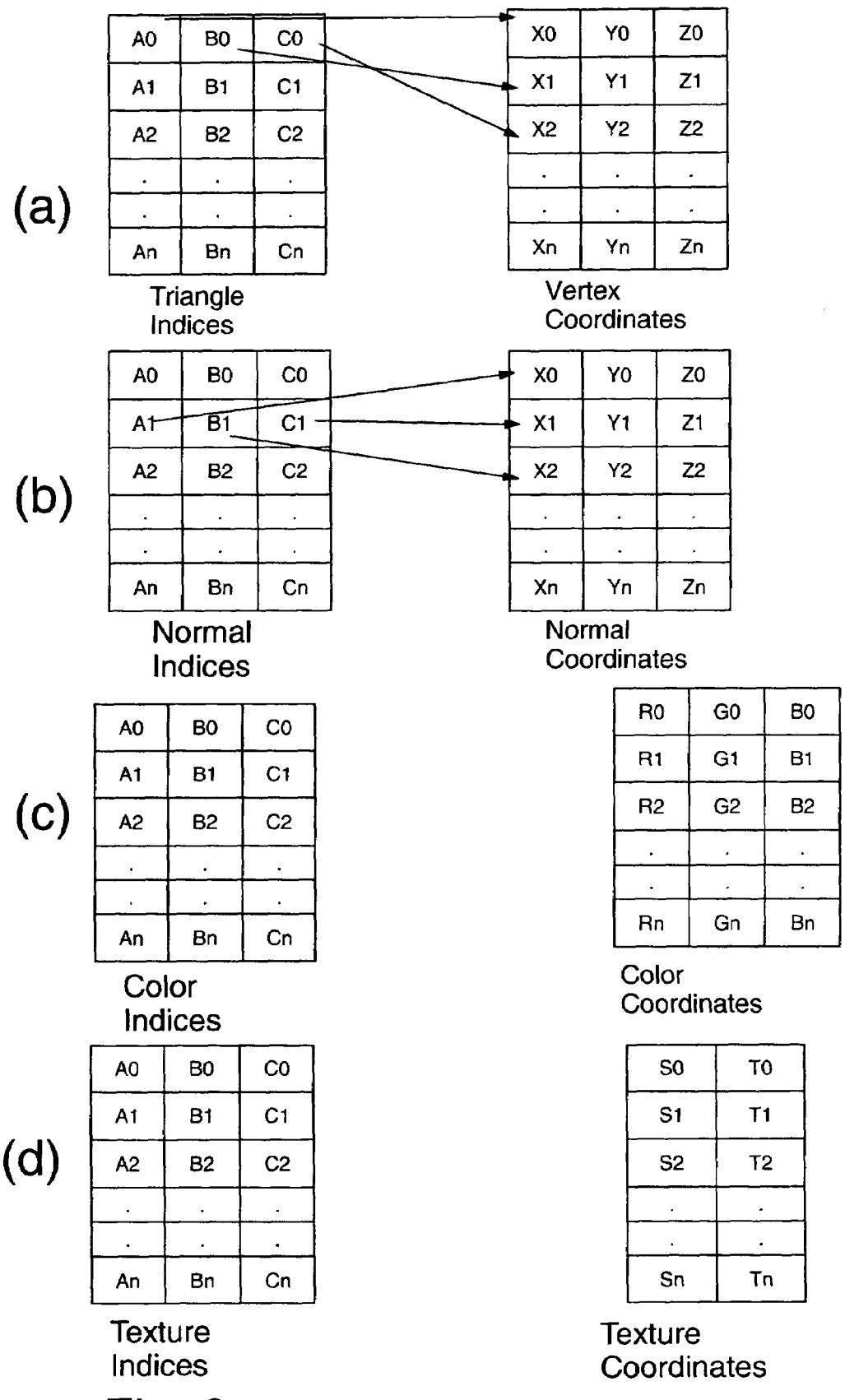
FIG. 2: Shows an example of an internal data format used in the Viewer application representing indexed sets used to store geometry, normal, color, and texture data.
Figure 4:
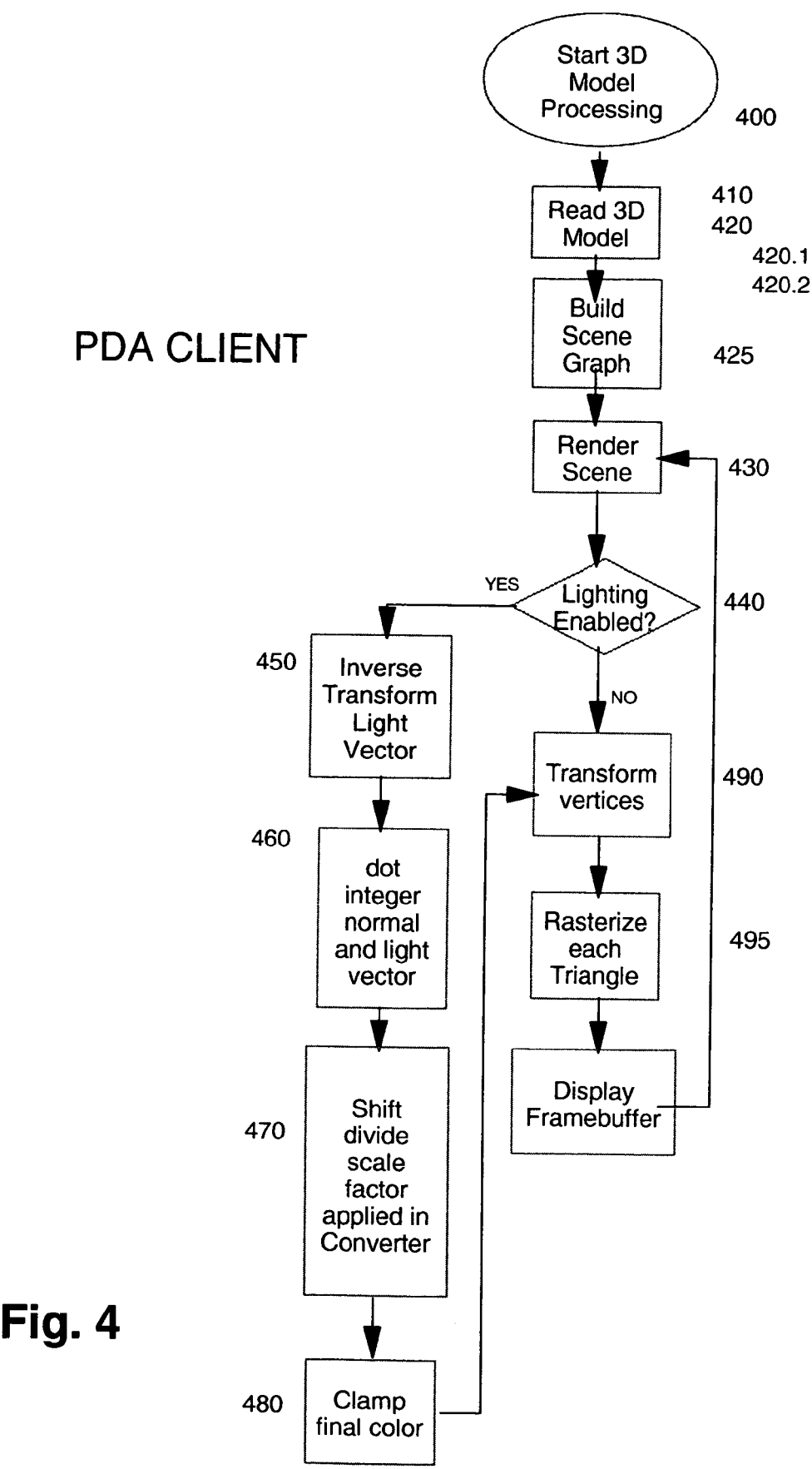
FIG. 4: Describes an example of a process by which normals are used to compute lighting intensities in the viewer application.
Figure 5:
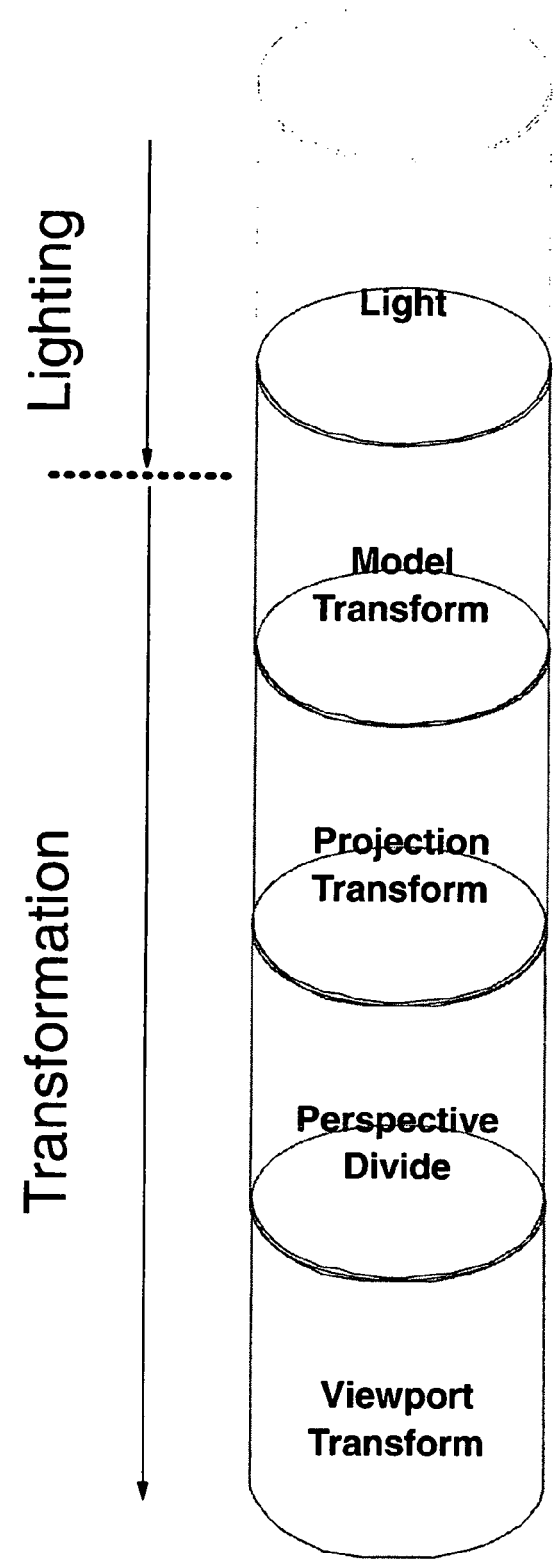
FIG. 5: Shows an example of stages of geometry processing that take place in the viewer application when lighting is done before any other processing.
Figure 6:
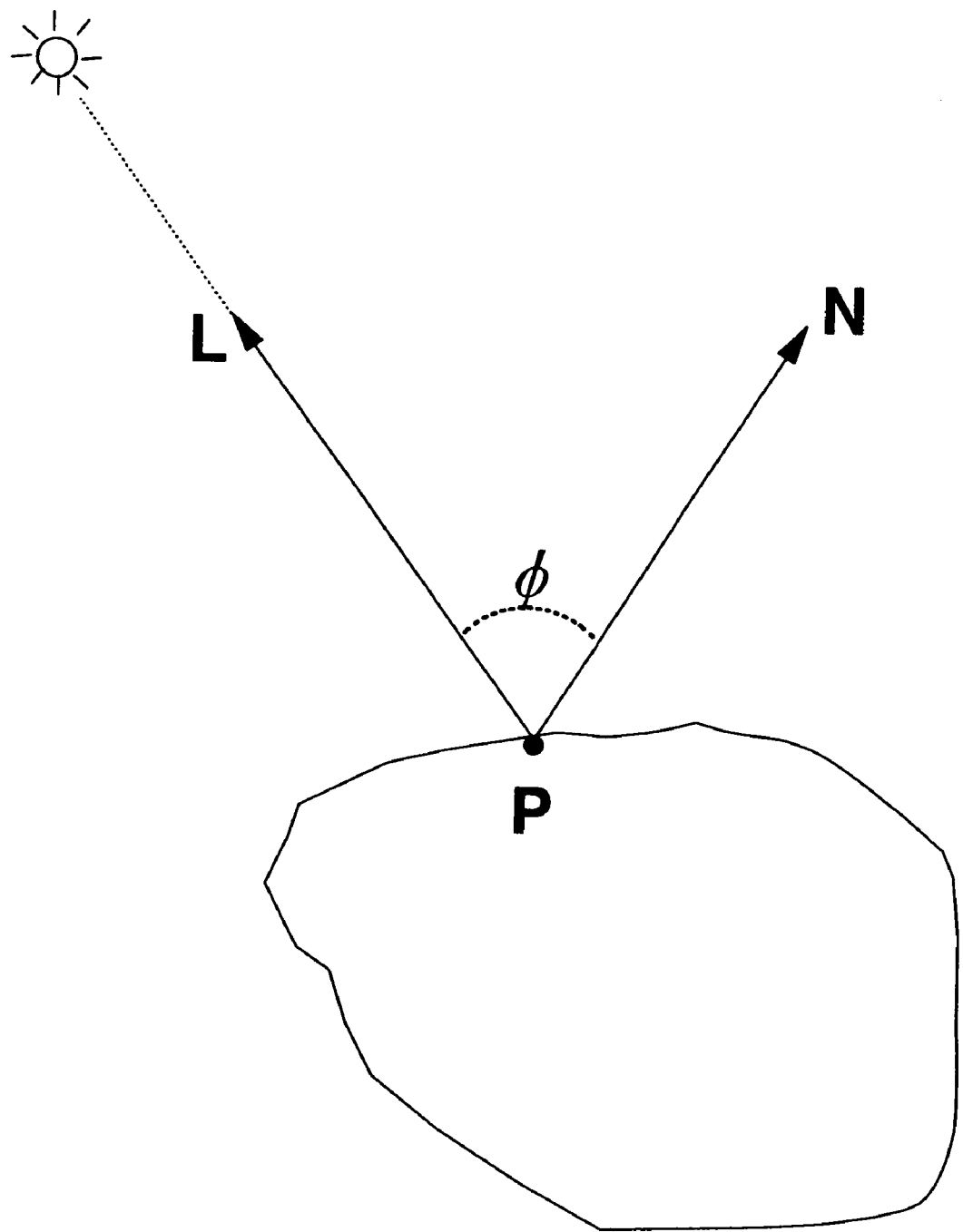
FIG. 6: Shows an example of a Lambertian (example of a type of diffuse) lighting model in which a vector from a point on the surface being lit is drawn to the light sources as well as a vector in the direction normal to the point on the surface.

The display system viewer must parse the file and decode the compressed normals. FIG. 4 shows a flow chart for processing that takes place on the display system. The process begins with reading and parsing the data file created by the Converter 410. Decoding each 16-bit compressed value results in a single 3-tuple normal direction vector in integer format 420,420.1, 420.2. The viewer stores the uncompressed normal in its internal database FIG. 2. FIG. 2 describes the display system viewers internal database format. It is important that the normals along with the other geometric model data be stored in an internal database for 2 reasons: (1) it will be used repeatedly in the lighting equation (2) repeated file access would be a performance bottleneck. Each type of coordinate—vertices, colors, normals, texture is stored in a coordinate table. A triangle index list is maintained for each type of coordinate, e.g. Vertex indices, color indices, normal indices, texture indices. This database employs indexed face sets to store polygonal models where sets of x,y,z coordinates represent vertex lists FIG. 2a, sets of p0, p1, p2 vertex indices are used to extract the x,y,z coordinates of each triangle in the model from the vertex list. The same scenario applies to colors, normals, and texture coordinates FIG. 2b, c, d. Whenever a triangle is processed the viewer uses the indices in each row of the table to lookup the corresponding vertices, colors, normals, and texture coordinates for each triangle. Indexed face sets are an efficient means of storing and referencing geometric model data and are used often in VRML model descriptions. Once the viewer database has been loaded the rendering pipeline can begin execution. The rendering pipeline operates in 2 stages: (1) geometry processing (2) rasterization. FIG. 5 shows the stages of geometry processing. For the purposes of this invention Lighting is applied first and the following stages—Model Transform, View Transform, Projection Transform, Perspective Divide, and Viewport Transform are applied by first transforming the triangles by the concatenated Model and Projection transformation matrices, then performing the perspective divide and finally applying the Viewport transformation. The Viewport transformation step can be removed since most applications will use the entire handheld screen at all times. Viewports typically refer to the portion of the display system to be used for displaying the model. If the display system contains a small display surface, the entire surface is typically utilized. The View transformation is a composition of rotations, scales, and translations that are specified through user input device(s). The matrices that reflect these transformations are a computed as a result of user input and are continuously updated and stored in the renderer. Once the geometry is lit and transformed it is passed to the rasterizer for scan conversion into pixels for display. The focus of this invention is the Lighting stage. During normal user viewing, the position and orientation of the geometric model is continuously updated as the result of processing user input. This changes how and where the light source strikes the surface. FIG. 6 shows how light direction and surface normal are used to compute the amount of light that exposes the surface, in this case a triangle in a plane. L represents the vector to the light source. N represents the vector normal to the surface being lit at a particular point. Equation (1) describes the traditional computation for computing the diffuse light intensity.

$$I = N \cdot L, \quad (1)$$

where N is the normal at vertex, corner, or face and L is the directional light vector.

This equation is traditionally applied to each normal where there can be a normal for every vertex, corner, or triangle face in the model. The resulting intensity, I, is then multiplied by the r, g, b color/material values, as in equation (2), (3), (4).

$$R = r * I \quad (2)$$

$$G = g * I \quad (3)$$

$$B = b * I \quad (4)$$

The resulting value for each RGB channel is clamped between 0.0 and 1.0, before being converted to an integer value in the range of $0 \ldots 2^m$, where m is equal to the number of bits used to represent each color channel in the graphics frame buffer (5). Although this equation uses RGB color model, it is important to note that this invention can be applied to any display system color model including, but not exclusive of YUV, CMYK, HSB, etc.

$$R_f = R * 2^m \text{ for } 0 <= R <= 1.0 \quad (5)$$

Because the display device may lack the floating point capability to perform the computation without a negative performance impact, an alternative approach is given. Equation (6) describes the integer based approach used in this invention.

$$I_c = N_C \cdot L, \text{ where } N \subset \{-2^{32} \ldots 2^{31}-1\} \text{ and}$$
$$L \subset \{-2^{32} \ldots 2^{31}-1\}, \quad (6)$$

$I_c$ equals the color intensity where c is R, G, or B $N_C$ equals the precomputed product of each color and normal The above equation assumes that both N and L have been previously converted to integer space using a scale factor that is a power of two. This is an important point because later a shift instruction will be executed by the CPU to remove this scale factor. A shift instruction is a single cycle instruction on modern CPUs and is advantageous over a divide or multiply for performance reasons.

Note that both equation (1) and (6) do not explicitly deal with color, only intensity. In the case of equation (1), once the intensity is computed it is multiplied by the current material color for each color channel—R, G, B (2),(3),(4). In the case of equation (6) the material color has already been factored into the normal during the Conversion stage. This is one of the innovations in this invention. An example of coding the function for processing the lighting equation is as follows:

```
//*********************************************************************//
//******           Integer Lighting***************************************//
//*********************************************************************//
void LightVertices(Int16* coord, UInt8* litColors)
{
    unsigned char r, g, b;
    unsigned char cindx;
    int             h, i, j, i0, j0, k0, l0, n0;
    int             dlr = light.dr;
    int             dlg = light.dg;
    int             dlb = light.db;
    int             slr = light.sr;
    int             slg = light.sg;
    int             slb = light.sb;
    int             *lpos = light.pos;
    int             trlpos[3];
    int             n[3]
    Float           invMatrix[12];
    register int    dmr, dmg, dmb;
    register int    bfnvp, nvp;
    register int    lx, ly, lz;
    register int    m0, m1, m2;
    register int    m4, m5, m6;
    register int    m8, m9, m10;
    // transform light position vector by inverse transform of modelview
    TransposeMatrix(invMatrix, lightrotation);
    // row 0
    m0 = (int) (invMatrix[0] * FLSHIFT);
    m4 = (int) (invMatrix[4] * FLSHIFT);
    m8 = (int) (invMatrix[8] * FLSHIFT);
    // row 1
    m1 = (int) (invMatrix[1] * FLSHIFT);
    m5 = (int) (invMatrix[5] * FLSHIFT);
    m9 = (int) (invMatrix[9] * FLSHIFT);
    // row 2
    m2 = (int) (invMatrix[2] * FLSHIFT);
    m6 = (int) (invMatrix[6] * FLSHIFT);
    m10 = (int) (invMatrix[10] * FLSHIFT);
    lx = lpos[0];
    ly = lpos[1];
    lz = lpos[2];
    trlpos[0] = (int)((__int64)(lx * m0 + ly * m4 + lz * m8) >> 15);
    trlpos[1] = (int)((__int64)(lx * m1 + ly * m5 + lz * m9) >> 15);
    trlpos[2] = (int)((__int64)(lx * m2 + ly * m6 + lz * m10) >> 15);
    if(materialindex != -1) {
        int index = materialindex*3;
        dmr = color[index++];
        dmg = color[index++];
        dmb = color[index];
    }
    switch(normbind) {
        case 0:                                             // no normals, no lighting
            break;
        case PER_FACE:                                      // normal per face
            for(h=i=0;i<nTriangles;i++) {
                cindx = colorIndex[i];                      // r,g,b
                for(j=0;j<3;j++,h++) {
                                                            // compute color
                    i0 = 3*coordIndex[h];
                }
            }
            break;
        case PER_VERTEX: // normal per vertex
            for (i=0,h=0; i<nTriangles; i++) {
                for (j=0; j<3; j++,h++) {
                    //compute color
                    k0 = coordIndex[h];                     // h==3*i+j
```

```
                    i0 = 10 = n0 = k0 * 3;
                    if (materialindex < 0) {
                        j0 = 3*colorIndex[k0];
                        dmr = color[j0]; j0++;// r
                        dmg = color[j0]; j0++;           // g
                        dmb = color[j0];                  // b
                    }
                    // light here
                    n[0] = normals[n0]; n0++;            // nx
                    n[1] = normals[n0]; n0++;            // ny
                    n[2] = normals[n0];                   // nz
                    nvp = (int)(((__int64)DOT3(n, trlpos)) >> 15);
                    // (VRML solid flag == false, 2-side lighting)
                    if (!solid) {
                        bfnvp = -nvp;
                        nvp = MAX2(nvp,bfnvp);
                        r = (UInt8) ((dmr * nvp) >> 15);
                        g = (UInt8) ((dmg * nvp) >> 15);
                        b = (UInt8) ((dmb * nvp) >> 15);
                    }
                    else {
                        nvp = MAX2(nvp,0);
                        r = (UInt8) ((dmr * nvp) >> 15);
                        g = (UInt8) ((dmg * nvp) >> 15);
                        b = (UInt8) ((dmb * nvp) >> 15);
                    }
                    litColors[10] = r + AMBIENT; 10++;   // r
                    litColors[10] = g + AMBIENT; 10++;   // g
                    litColors[10] = b + AMBIENT;         // b
                }
            }
            break;
        case PER_CORNER: // normal per corner
            for (i=0, h=0; i<nTriangles; i++) {
                for (j=0; j<3; j++,h++) {
                    //compute color
                    10 = n0 = 3 * h;
                    // only if shape doesn't have material property
                    if (materialindex < 0) {
                        j0 = 3*colorIndex[h];
                        dmr = color[j0]; j0++;           // r
                        dmg = color[j0]; j0++;           // g
                        dmb = color[j0];                  // b
                    }
                    // light here
                    n[0] = normals[n0]; n0++;            // nx
                    n[1] = normals[n0]; n0++;            // ny
                    n[2] = normals[n0];                   // nz
                    nvp = (int)((__int64)DOT3(n, trlpos)>>15);
                    // (VRML solid flag == false, 2-side lighting)
                    if (!solid) {
                        bfnvp = -nvp;
                        nvp = MAX2(nvp,bfnvp);
                        r = (UInt8) ((__int64)(dmr * nvp) >> 15);
                        g = (UInt8) ((__int64)(dmg * nvp) >> 15);
                        b = (UInt8) ((__int64)(dmb * nvp) >> 15);
                    }
                    else {
                        nvp = MAX2(nvp,0);
                        r = (UInt8) ((__int64)(dmr * nvp) >> 15);
                        g = (UInt8) ((__int64)(dmg * nvp) >> 15);
                        b = (UInt8) ((__int64)(dmb * nvp) >> 15);
                    }
                    litColors[10] = r + AMBIENT; 10++;   // r
                    litColors[10] = g + AMBIENT; 10++;   // g
                    litColors[10] = b + AMBIENT;         // b
                }
            }
            break;
        default: break;
        }
    }
****************************
```

Thus the present invention includes a method comprising the steps of scaling by a scaling factor a first digitized data of a 3D model or models stored as a floating point datatype into scaled digitized data. The scaling factor being a proper power of two. Converting the scaled digitized data into an integer datatype forming second digitized data. Enabling a transfer of the second digitized data to a display system using a compression scheme optimized for integer data; and facilitating lighting and shading the second format of digitized data on a display system.

In some embodiments of the method, the step of scaling includes applying the scaling factor to each component of a 3-tuple representing each normal, where each vertex may have at least one normal bound to it; and/or the step of converting includes rounding upward to a nearest integer; and/or the step of converting includes truncating to an integer; and/or the step of converting includes a fast float to integer conversion utilizing knowledge of the floating point storage representation and the union data structure that allows a single memory location a to be interpreted as both an integer and floating point data type. An alternate is to skip the conversion to integer here and compress as floating point data. This provides the use of alternative compression techniques that may be more efficient on certain datatypes than others. Conversion to integer can done within the viewer during model transfer;

In some embodiments of the method, the step of enabling includes compressing the second digitized data; and/or the step of enabling includes packaging the second digitized data in a format required for transfer via the Internet; and/or the step of facilitating includes decompressing the second digitized data, and transforming a light direction vector, of a light source directed at the 3D model, by an inverse rotation matrix.

If view scaling is limited to symmetric scaling, the inverse of the rotation matrix can be used to scale the light vector. The inverse of the rotation matrix is by definition the transpose of the rotation matrix. ;If view scaling is not limited to symmetric scaling, the inverse of the view transformation matrix must be computed. This is computationally much more expensive that taking the transpose of a matrix;

In some embodiments of the method, the step of lighting includes computing a dot product of a light direction vector and each normal; and/or the step of shading includes: interpolating red, green, and blue integer values at 3D model vertices, and determining interior pixel values. It is noted that the step of; interpolating does not have to be limited to red, green, and blue integer values. It can be applied to any r color model being used. This can include, but is not limited to color models such as HSV, CMYK, LUV, etc. The step of interpolating is generally unavoidable when scan converting a triangle. There are a variety of techniques used to scan convert a triangle, but each technique will process the color intensity calculated by the lighting equation to compute the colors of pixels that fall within a boundary formed by the three vertices of a triangle. Embodiments of this invention compute those color intensities with a fast lighting equation algorithm that is especially suited to perform well on low-power display systems such as cell phones and PDAs.

In some embodiments of the method, a power of two is a proper power of two, where the power of two being used as a scale factor of the first digitized data does not result in the second digitized data exceeding a maximum integer value minus a maximum color value representable on the display system; and/or further comprises the steps of multiplying each material property by the dot product to form a combined property, performing an arithmetic shift right on the combined property by the proper power of two, and clamping the combined property so that resulting value is between zero and a maximum material property within a bit depth of a color buffer on the display system. The combined property can be cast to higher precision integer when it is being computed to ensure that no datatype overflow occurs. This may be a negative performance impact so the method used in this implementation selects a power of two scale factor that insures that no overflow occurs and avoids any casting to higher precision integers.

In some embodiments of the method, the step of shading includes interpolating vertex attributes integer values at 3D model vertices, and determining interior pixel values; and/or the step of lighting is performed employing a platform attribute taken from a group of platform attributes consisting of: using real-time frame rates; using a low compute power; using resource constrained device; and any combination of these; and/or further comprises the step of storing the second digitized data in at least one model files to be processed by the display system; and/or the first digitized data is in VRML; and/or the 3D model is a wireframe; and/or the 3D model is expressed as a higher order primitive that can be processed to a wireframe representation.

The present invention also includes a method for rendering to a display device lighted triangle data of a 3D geometric model at real-time frame rates. It includes the steps of: scaling and compressing 3D normal data of the 3D geometric model to form scaled normal data; decompressing the scaled normal integer data on the device and storing the scaled normal integer data as decompressed data; applying diffuse lighting equation to the decompressed data to form scaled color intensities of the 3D geometric model; performing an arithmetic shift upon the scaled color intensities to remove the scaling and obtain true color intensities at each triangle vertex; scan converting at least one triangle of the 3D geometric model.

In some embodiments of the method, the method further comprises storing an optimized representation of the 3D geometric model in model files to be processed by the device; and/or the step of rendering includes transforming and projecting 3-dimensional triangle vertices from a 3-dimensional object coordinate system to a 2-dimensional image display surface;

and/or the step of scaling normal data includes processing 3D normal vectors for each bound vertex by scaling them by a power of two scale factor, and converting to an integer datatype, and the step of compressing normal data includes compressing three 32 bit signed integer values into a single 16-bit unsigned integer value; and/or the step of decompressing includes extracting a 3-tuple integer normal and storing the 3-tuple fixed point integer normal for use in diffuse lighting equations; and/or the diffuse lighting equations are executed using the normal data; and/or the step of processing occurs in one of: off-line and during display system-server synchronization; and/or the device is a handheld device and the step of decompressing occurs on the handheld device during the loading of the optimized model, and the step of storing includes storing the resulting 3-tuple as three 32-bit signed integers; and/or the step of applying diffuse lighting equations includes extracting an inverse transpose of a current rotation matrix and transforming at least light vector.

The present invention includes an apparatus comprising: means for scaling by a scaling factor first digitized data of a 3D model in a floating point datatype into scaled digitized data, the scaling factor being a proper power of two; means for converting the scaled digitized data into an integer datatype forming second digitized data; means for enabling a transfer of the second digitized data to a display system; and means for facilitating lighting and shading the second format of digitized data.

The present invention also includes an apparatus comprising means for rendering to a device lighted triangle data of a 3D geometric model at real-time frame rates. The means for rendering includes: means for scaling and compressing 3D normal data of the 3D geometric model to form scaled normal data; means for decompressing the scaled normal data on the device and converting the scaled normal data to fixed point representation to form decompressed data; means for applying diffuse lighting equation to the decompressed data to form scaled color intensities of the 3D geometric model; means for performing an arithmetic shift upon the scaled color intensities to remove the scaling and obtain true color intensities at each triangle vertex; means for scan converting at least one triangle of the 3D geometric model.

The present invention includes as apparatus comprising: a means for computing normal data when it is not included in the original geometric model it can be generated using knows methods for generating normals; in this case it is possible to include the scaling of the normal with the generation of the normal thereby performing a single step to generate scaled normals.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. Thus although the description is made referring to VRML 2.0, it is similarly applicable to other data formats. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Figure 7:
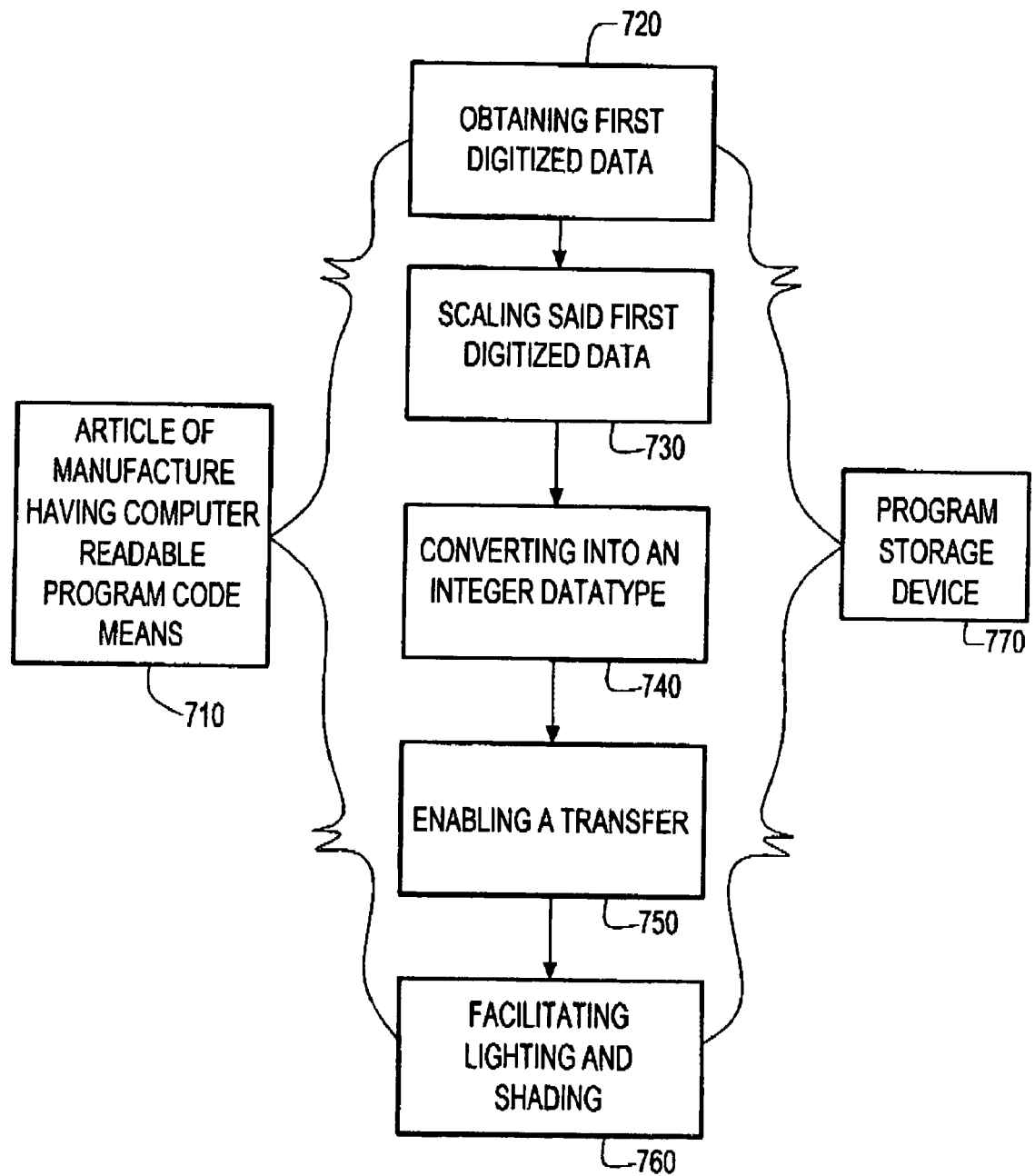
FIG. 7 shows an article of manufacture comprising a computer usable medium having computer readable program code means embodied therein for causing lighting.

Thus, the invention includes an article of manufacture comprising a computer usable medium having computer readable program code means 710 embodied therein for causing lighting, as shown in FIG. 7. The computer readable program code means in the article of manufacture comprising computer readable program code means for causing a computer to effect the steps of: obtaining first digitized data 720 of a 3D model in a floating point datatype; scaling 730 said first digitized data by a scaling factor to form scaled digitized data, said scaling factor being a proper power of two; converting said scaled digitized data into an integer datatype forming second digitized data 740; enabling a transfer 750 of said second digitized data to a display system; and facilitating lighting and shading 760 said second format of digitized data. The invention includes a program storage device 770 readable by machine, tangibly embodying a program of instructions executable by the machine to perform method steps for lighting, including the steps of 720, 730, 740, 750 and 760.

Figure 8:
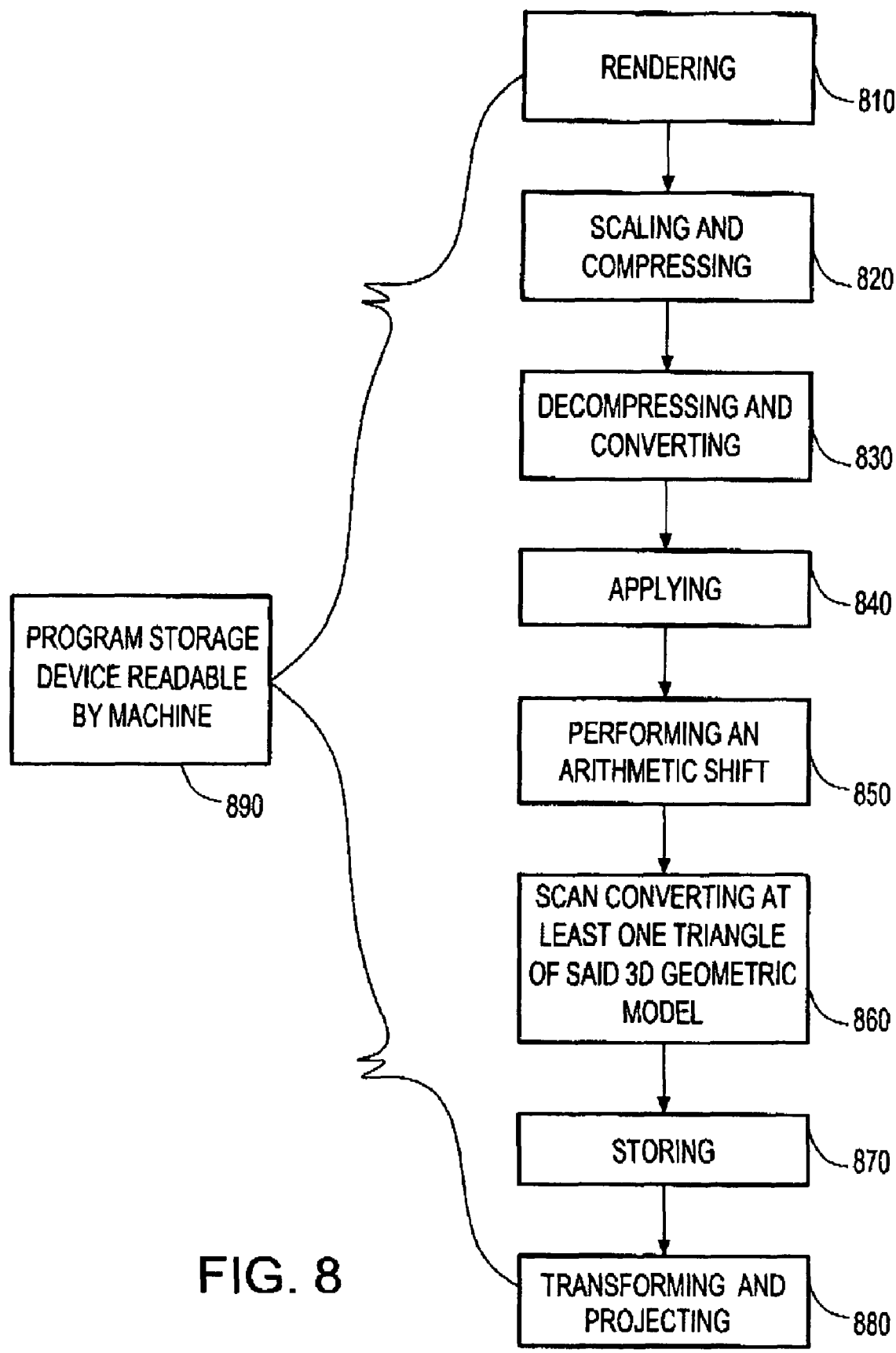
FIG. 8 shows an example method of the present invention.

The invention further includes a method including the steps shown in FIG. 8. The method includes the step of rendering 810 to a device lighted triangle data of a 3D geometric model at real-time frame rates. The step of rendering 810 includes the steps of: scaling and compressing 820 3D normal data of said 3D geometric model to form scaled normal data; decompressing 830 the scaled normal data on the device and converting the scaled normal data to fixed point representation to form decompressed data; applying 840 diffuse lighting equation to said decompressed data to form scaled color intensities of said 3D geometric model; performing an arithmetic shift 850 upon said scaled color intensities to remove the scaling and obtain true color intensities at each triangle vertex; and scan converting 860 at least one triangle of said 3D geometric model.

In some embodiments, the method: includes storing 870 an optimized representation of said 3D geometric model in model files to be processed by said device; and/or the step of rendering includes transforming and projecting 880 3-dimensional triangle vertices from a 3-dimensional object coordinate system to a 2-dimensional image display surface; and/or the step of scaling normal data includes processing 3D normal vectors for each bound vertex by scaling them by a power of two scale factor, and converting to an integer datatype, and the step of compressing normal data includes compressing three 32 bit signed integer values into a single 16-bit unsigned integer value; and/or the step of decompressing includes extracting a 3-tuple integer normal and storing the 3-tuple fixed point integer normal for use in diffuse lighting equations; and/or the diffuse lighting equations are executed using the normal data; and/or the step of processing occurs in one of: off-line and during display system-server synchronization; and/or the device is a handheld device and the step of decompressing occurs on the handheld device during the loading of the optimized model, and the step of storing includes storing the resulting 3-tuple as three 32-bit signed integers; and/or the step of applying diffuse lighting equations includes extracting an inverse transpose of a current rotation matrix and transforming at least light vector.

In some embodiments the invention includes an article of manufacture comprising a computer usable medium 880 having computer readable program code means embodied therein for causing lighting, the computer readable program code means in said article of manufacture comprising computer readable program code means for causing a computer to effect the steps of the method.

In some embodiments the invention includes a program storage device 890 readable by machine, tangibly embodying a program of instructions executable by the machine to perform method steps for lighting, said method steps comprising the steps of claim of the method.

Figure 9:
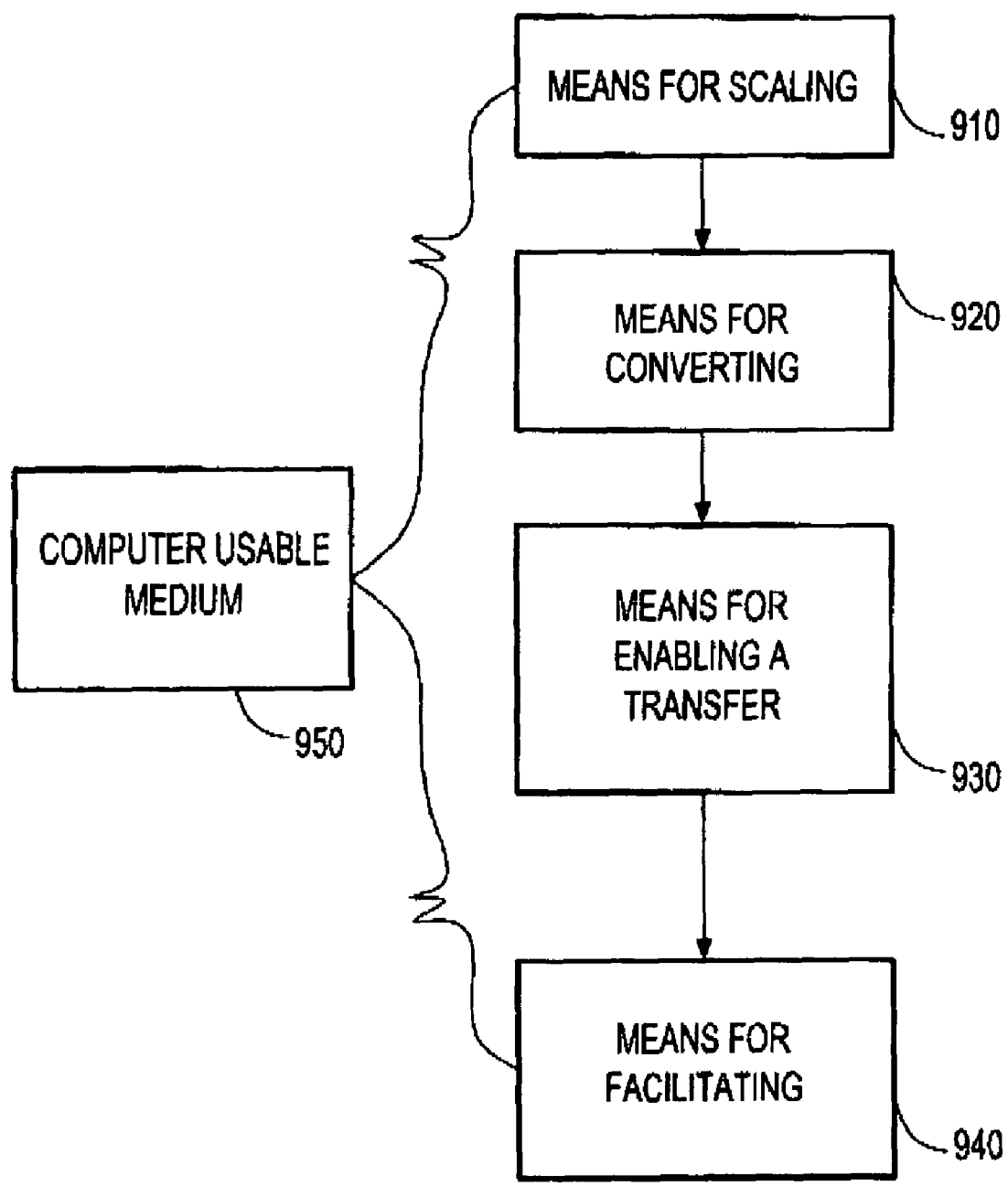
FIG. 9 shows an example apparatus of the present invention.

The invention includes an apparatus shown in FIG. 9. The apparatus includes: means for scaling 910 by a scaling factor first digitized data of a 3D model in a floating point datatype into scaled digitized data, the scaling factor being a proper power of two; means for converting 920 said scaled digitized data into an integer datatype forming second digitized data; means for enabling a transfer 930 of said second digitized data to a display system; and means for facilitating 940 lighting and shading said second format of digitized data.

In some embodiments the invention includes a computer program product comprising a computer usable medium 950 having computer readable program code means embodied therein for causing lighting, the computer readable program code means in said computer program product comprising computer readable program code means for causing a computer to effect the functions of the apparatus.

Figure 10:
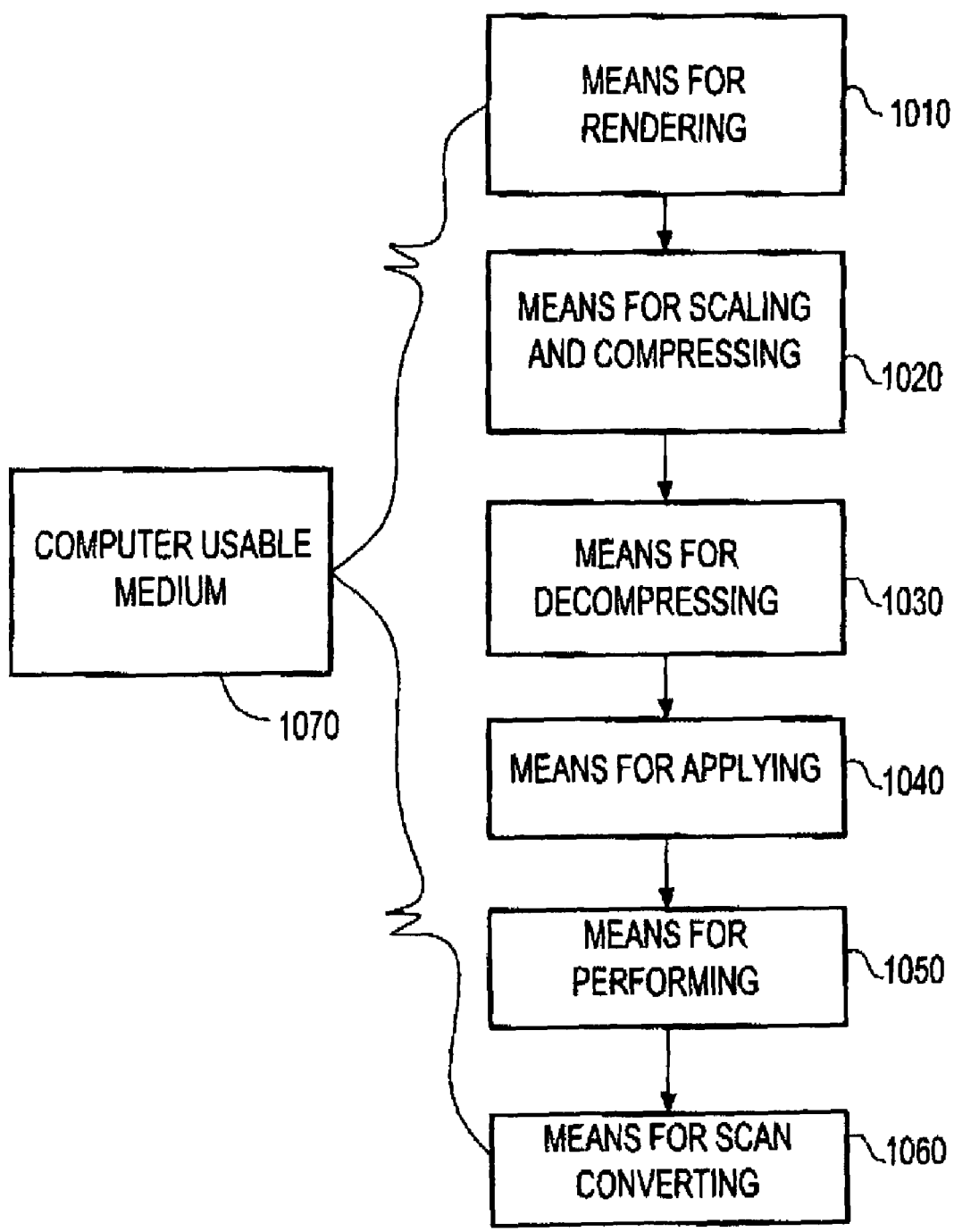
FIG. 10 shows another example apparatus of the present invention.

The invention includes an apparatus shown in FIG. 10. An apparatus includes means for rendering 1010 to a device lighted triangle data of a 3D geometric model at real-time frame rates. The means for rendering includes: means for scaling and compressing 1020 3D normal data of said 3D geometric model to form scaled normal data; means for decompressing 1030 the scaled normal data on the device and converting the scaled normal data to fixed point representation to form decompressed data; means for applying 1040 diffuse lighting equation to said decompressed data to form scaled color intensities of said 3D geometric model; means for performing 1050 an arithmetic shift upon said scaled color intensities to remove the scaling and obtain true color intensities at each triangle vertex; and means for scan converting 1060 at least one triangle of said 3D geometric model. In some embodiments the invention includes a computer program product comprising a computer usable medium 1070 having computer readable program code means embodied therein for causing lighting, the computer readable program code means in said computer program product comprising computer readable program code means for causing a computer to effect the functions of the apparatus.

Figure 11:
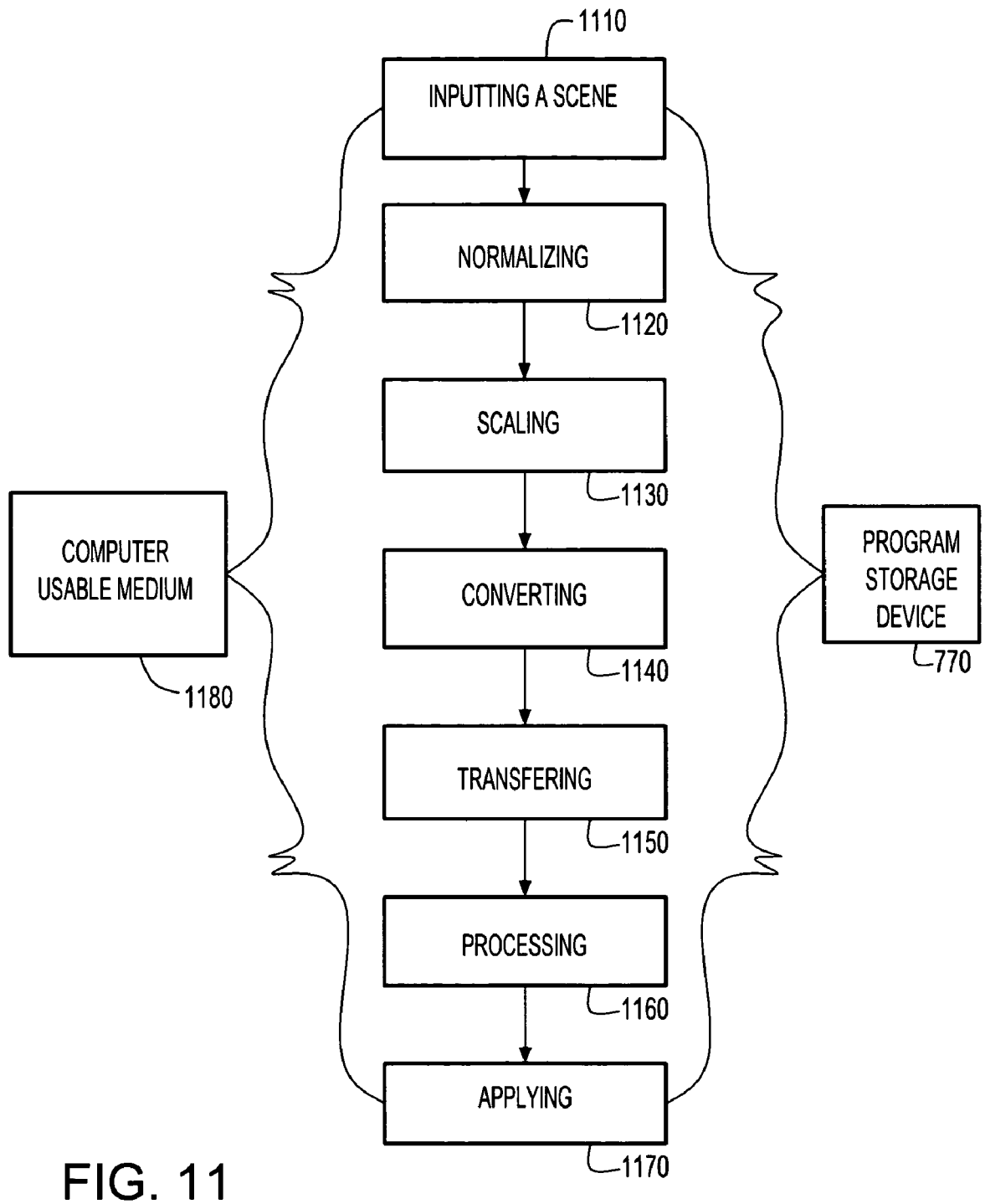
FIG. 11 shows another example method of the present invention.

The invention includes a method shown in FIG. 11. The method includes the steps of: inputting a scene 1110 description file; normalizing 1120 floating point direction vectors in the file to form floating point 3-tuple normal direction vectors; scaling 1130 the floating point 3-tuple normal direction vectors of the file by an increasing scaling factor that is a power of two and is within a maximum representable integer value of a target device to form a scaled integer 3-tuple normal direction vector; converting 1140 the scaled integer 3-tuple normal direction vector to an integer datatype; transferring 1150 the normal direction vector as an integer datatype to a display system; processing 1160 the integer normal direction vector to form a dot product of said integer normal direction vector with a light vector representing a direction of a source of light being used to simulate a lit 3D environment in the computer display system; and applying 1170 a material property for each color change channel representable in the color model to the dot product computed.

In some embodiments the invention includes an article of manufacture comprising a computer usable medium 1180 having computer readable program code means embodied therein for causing lighting, the computer readable program code means in said article of manufacture comprising computer readable program code means for causing a computer to effect the steps of the method.

In some embodiments the invention includes a program storage device 1190 readable by machine, tangibly embodying a program of instructions executable by the machine to perform method steps for lighting, said method steps comprising the steps of the method.

I claim:

1. A method comprising:
   obtaining first digitized data of a 3D model in a floating point datatype;
   scaling said first digitized data by a scaling factor to form scaled digitized data, said scaling factor being a proper power of two;
   converting said scaled digitized data into an integer datatype forming second digitized data;
   enabling a transfer of said second digitized data to a display system; and
   facilitating lighting and shading said second format of digitized data.

2. A method as recited in claim 1, wherein the step of scaling includes applying said scaling factor to each component of a 3-tuple representing each normal.

3. A method as recited in claim 1, wherein the step of converting includes rounding upward to a nearest integer.

4. A method as recited in claim 1, wherein the step of enabling includes compressing said second digitized data.

5. A method as recited in claim 4, wherein the step of facilitating includes decompressing said second digitized data; and
   transforming a light direction vector, of a light source directed at said 3D model, by an inverse rotation matrix.

6. A method as recited in claim 1, wherein the step of lighting includes computing a dot product of a light direction vector and each normal.

7. A method as recited in claim 1 wherein the step of shading includes:

interpolating red, green, and blue integer values at 3D model vertices; and determining interior pixel values.

8. A method as recited in claim 1, wherein a power of two is proper power of two, when said power of two being used as a scale factor of said first digitized data does not result in said second digitized data exceeding a maximum integer value minus a maximum color value representable on said display system.

9. A method as recited in claim 6, further comprising multiplying each material property by said dot product to form a combined property;

performing an arithmetic shift right on the combined property by the proper power of two, and clamping said combined property so that resulting value is between zero and a maximum material property within a bit depth of a color buffer on said display system;

wherein the step of shading includes interpolating vertex attributes integer values at 3D model vertices, and determining interior pixel values.

10. A method as recited in claim 6, wherein the step of lighting is performed employing a platform attribute taken from a group of platform attributes consisting of: using real-time frame rates; using a low compute power; using a resource constrained device; and any combination of these.

11. A method as recited in claim 1, further comprising storing said second digitized data in at least one model files to be processed by said display system.

12. A method as recited in claim 1, wherein said first digitized data is in VRML.

13. A method as recited in claim 1, wherein said 3D model is a wireframe.

14. An article of manufacture comprising a computer usable medium having computer readable program code means embodied therein for causing lighting, the computer readable program code means in said article of manufacture comprising computer readable program code means for causing a computer to effect the steps of:

obtaining first digitized data of a 3D model in a floating point datatype;

scaling said first digitized data by a scaling factor to form scaled digitized data, said scaling factor being a proper power of two;

converting said scaled digitized data into an integer datatype forming second digitized data;

enabling a transfer of said second digitized data to a display system; and facilitating lighting and shading said second format of digitized data.

15. A program storage device readable by machine, tangibly embodying a program of instructions executable by the machine to perform method steps for lighting, said method steps comprising the steps of:

obtaining first digitized data of a 3D model in a floating point datatype;

scaling said first digitized data by a scaling factor to form scaled digitized data, said scaling factor being a proper power of two;

converting said scaled digitized data into an integer datatype forming second digitized data;

enabling a transfer of said second digitized data to a display system; and facilitating lighting and shading said second format of digitized data.

16. A method comprising:

rendering to a device lighted triangle data of a 3D geometric model at real-time frame rates, comprising the steps of:

scaling and compressing 3D normal data of said 3D geometric model to form scaled normal data;

decompressing the scaled normal data on the device and converting the scaled normal data to fixed point representation to form decompressed data;

applying diffuse lighting equation to said decompressed data to form scaled color intensities of said 3D geometric model;

performing an arithmetic shift upon said scaled color intensities to remove the scaling and obtain true color intensities at each triangle vertex;

scan converting at least one triangle of said 3D geometric model.

17. A method a method as recited in claim 16, further comprising storing an optimized representation of said 3D geometric model in model files to be processed by said device.

18. A method as recited in claim 16, wherein the step of rendering includes transforming and projecting 3-dimensional triangle vertices from a 3-dimensional object coordinate system to a 2-dimensional image display surface.

19. A method as recited in claim 16, wherein the step of scaling normal data includes processing 3D normal vectors for each bound vertex by scaling them by a power of two scale factor, and converting to an integer datatype, and the step of compressing normal data includes compressing three 32 bit signed integer values into a single 16-bit unsigned integer value.

20. A method as recited in claim 19, wherein the step of decompressing includes extracting a 3-tuple integer normal and storing the 3-tuple fixed point integer normal for use in diffuse lighting equations.

21. A method as recited in claim 20, wherein the diffuse lighting equations are executed using the normal data.

22. A method as recited in claim 19, wherein the step of processing occurs in one of: off-line and during display system-server synchronization.

23. A method as recited in claim 17, wherein the device is a handheld device and the step of decompressing occurs on the handheld device during the loading of the optimized model, and the step of storing includes storing the resulting 3-tuple as three 32-bit signed integers.

24. A method as recited in claim 16, wherein the step of applying diffuse lighting equations includes extracting an inverse transpose of a current rotation matrix and transforming at least light vector.

25. An article of manufacture comprising a computer usable medium having computer readable program code means embodied therein for causing lighting, the computer readable program code means in said article of manufacture comprising computer readable program code means for causing a computer to effect the steps of;

rendering to a device lighted triangle data of a 3D geometric model at real-time frame rates, comprising the steps of:

scaling and compressing 3D normal data of said 3D geometric model to form scaled normal data;

decompressing the scaled normal data on the device and converting the scaled normal data to fixed point representation to form decompressed data;

applying diffuse lighting equation to said decompressed data to form scaled color intensities of said 3D geometric model;

performing an arithmetic shift upon said scaled color intensities to remove the scaling and obtain true color intensities at each triangle vertex;

scan converting at least one triangle of said 3D geometric model.

26. A program storage device readable by machine, tangibly embodying a program of instructions executable by the machine to perform method steps for lighting, said method steps comprising the steps of:

rendering to a device lighted triangle data of a 3D geometric model at real-time frame rates, comprising the steps of:

scaling and compressing 3D normal data of said 3D geometric model to form scaled normal data;

decompressing the scaled normal data on the device and converting the scaled normal data to fixed point representation to form decompressed data;

applying diffuse lighting equation to said decompressed data to form scaled color intensities of said 3D geometric model;

performing an arithmetic shift upon said scaled color intensities to remove the scaling and obtain true color intensities at each triangle vertex;

scan converting at least one triangle of said 3D geometric model.

27. An apparatus comprising:

means for scaling by a scaling factor first digitized data of a 3D model in a floating point datatype into scaled digitized data, said scaling factor being a proper power of two;

means for converting said scaled digitized data into an integer datatype forming second digitized data;

means for enabling a transfer of said second digitized data to a display system; and means for facilitating lighting and shading said second format of digitized data.

28. A computer program product comprising a computer usable medium having computer readable program code means embodied therein for causing lighting, the computer readable program code means in said computer program product comprising computer readable program code means for causing a computer to effect the functions of claim 27.

29. An apparatus comprising means for rendering to a device lighted triangle data of a 3D geometric model at real-time frame rates, said means for rendering comprising:

means for scaling and compressing 3D normal data of said 3D geometric model to form scaled normal data;

means for decompressing the scaled normal data on the device and converting the scaled normal data to fixed point representation to form decompressed data;

means for applying diffuse lighting equation to said decompressed data to form scaled color intensities of said 3D geometric model;

means for performing an arithmetic shift upon said scaled color intensities to remove the scaling and obtain true color intensities at each triangle vertex;

means for scan converting at least one triangle of said 3D geometric model.

30. A computer program product comprising a computer usable medium having computer readable program code means embodied therein for causing lighting, the computer readable program code means in said computer program product comprising computer readable program code means for causing a computer to effect the functions of claim 29.

31. A method comprising:

inputting a scene description file;

normalizing floating point direction vectors in the file to form floating point 3-tuple normal direction vectors;

scaling the floating point 3-tuple normal direction vectors of the file by an increasing scaling factor that is a power of two and is within a maximum representable integer value of a target device to form a scaled integer 3-tuple normal direction vector;

converting the scaled integer 3-tuple normal direction vector to an integer datatype;

transferring the normal direction vector as an integer datatype to a display system;

processing the integer normal direction vector to form a dot product of said integer normal direction vector with a light vector representing a direction of a source of light being used to simulate a lit 3D environment in the computer display system; and applying a material property for each color change channel representable in the color model to the dot product computed.

32. An article of manufacture comprising a computer usable medium having computer readable program code means embodied therein for causing lighting, the computer readable program code means in said article of manufacture comprising computer readable program code means for causing a computer to effect the steps of:

inputting a scene description file;

normalizing floating point direction vectors in the file to form floating point 3-tuple normal direction vectors;

scaling the floating point 3-tuple normal direction vectors of the file by an increasing scaling factor that is a power of two and is within a maximum representable integer value of a target device to form a scaled integer 3-tuple normal direction vector;

converting the scaled integer 3-tuple normal direction vector to an integer datatype;

transferring the normal direction vector as an integer datatype to a display system;

processing the integer normal direction vector to form a dot product of said integer normal direction vector with a light vector representing a direction of a source of light being used to simulate a lit 3D environment in the computer display system; and applying a material property for each color change channel representable in the color model to the dot product computed.

33. A program storage device readable by machine, tangibly embodying a program of instructions executable by the machine to perform method steps for lighting, said method steps comprising the steps of:

inputting a scene description file;

normalizing floating point direction vectors in the file to form floating point 3-tuple normal direction vectors;

scaling the floating point 3-tuple normal direction vectors of the file by an increasing scaling factor that is a power of two and is within a maximum representable integer value of a target device to form a scaled integer 3-tuple normal direction vector;

converting the scaled integer 3-tuple normal direction vector to an integer datatype;

transferring the normal direction vector as an integer datatype to a display system;

processing the integer normal direction vector to form a dot product of said integer normal direction vector with a light vector representing a direction of a source of light being used to simulate a lit 3D environment in the computer display system; and applying a material property for each color change channel representable in the color model to the dot product computed.

* * * * *